C. H. PERRIN.
Check-Rein Retainers.

No. 141,814.  Patented August 12, 1873.

Witnesses:

Inventor:
C. H. Perrin
Per
Attorneys.

UNITED STATES PATENT OFFICE.

CHARLES H. PERRIN, OF NEW YORK, ASSIGNOR TO SAMUEL E. TOMPKINS, OF SING SING, NEW YORK.

IMPROVEMENT IN CHECK-REIN RETAINERS.

Specification forming part of Letters Patent No. 141,814, dated August 12, 1873; application filed March 8, 1873.

*To all whom it may concern:*

Be it known that I, CHARLES H. PERRIN, of the city, county, and State of New York, have invented a new and Improved Mode of Retaining Check-Reins in Hooks, of which the following is a specification:

I propose to retain the check-reins in the check-rein hooks by a piece of elastic rubber in the form of a ring or loop, or any other suitable form, fastened under the hook near the end to the saddle, so as to be pressed down to admit the check-rein and then spring up to the hook, or nearly so, sufficiently to prevent the escape of the rein.

I prefer to use the screw which fastens the saddle to the tree to fasten the rubber, the screw passing through the rubber ring and a washer, having notches in the under side for the rubber ring, which is set up edgewise, to extend from under the washer at two opposite joints, while the uncut or notched portions of the washer are clamped down firmly on the saddle, and the bottoms of the notched portions are clamped on the ring of rubber sufficiently to hold it firmly in position; but other fastenings may be used, if preferred.

Figure 1:
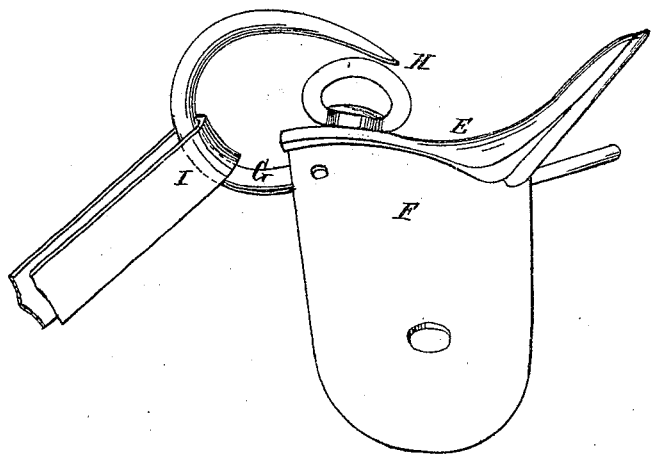
Figure 2:
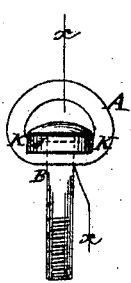
Figure 3:
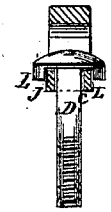

Figure 1 is a side elevation of a harness-saddle with a check-rein retainer arranged according to my invention. Fig. 2 is a side elevation of the retainer, the screw, and the washer; and Fig. 3 is a section of Fig. 2 on the line $x\,x$.

Similar letters of reference indicate corresponding parts.

A represents the rubber retainer, which, in this example, I have represented in the form of an irregular-curved ring, about as in Fig. 2, but it may be in the form of a cone, or any other suitable shape, the part B being flattened a little to seat it on the saddle, and having a hole, C, for the screw D, which fastens the saddle E to the tree or frame F, also the hook G to pass through. This ring will consists of a round or oval piece of elastic rubber, having sufficient stiffness to maintain its position against any action of the check-rein I on it after the rein is introduced into the hook, but so that it can be easily pressed down to allow the check-rein to pass between it and the point H of the hook, with which it will be arranged about as represented in the drawing. J is the metal washer, which is notched at K, where it crosses the rubber retainer, so that it sets on the saddle at the sides L, and is screwed firmly against it thereat, and at the same time compresses the retainer at the notches sufficiently to hold it firmly, but so that it does not sustain much of the pressure of the screw.

I do not, however, limit myself to this method of fastening it.

Having thus described my invention, I claim as new and desire to secure by Letters Patent—

An elastic check-rein guard, constructed as described, and applied to the ordinary check-hook bolt, for the purpose set forth.

CHARLES H. PERRIN.

Witnesses:
C. SEDGWICK,
ALEX. F. ROBERTS.